(12) United States Patent
Piok et al.

(10) Patent No.: US 12,025,736 B2
(45) Date of Patent: Jul. 2, 2024

(54) OBJECT SPECIFIC MEASURING WITH AN OPTO-ELECTRONIC MEASURING DEVICE

(71) Applicant: HEXAGON TECHNOLOGY CENTER GMBH, Heerbrugg (CH)

(72) Inventors: Thomas Piok, Koblach (AT); Jürg Hinderling, Marbach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 840 days.

(21) Appl. No.: 17/113,168

(22) Filed: Dec. 7, 2020

(65) Prior Publication Data
US 2021/0181346 A1 Jun. 17, 2021

(30) Foreign Application Priority Data
Dec. 16, 2019 (EP) ..................... 19216635

(51) Int. Cl.
*G01C 3/08* (2006.01)
*G01S 7/48* (2006.01)
*G01S 7/481* (2006.01)
*G01S 17/10* (2020.01)
*G01S 17/89* (2020.01)

(52) U.S. Cl.
CPC .......... *G01S 7/4802* (2013.01); *G01S 7/4815* (2013.01); *G01S 7/4817* (2013.01); *G01S 17/10* (2013.01); *G01S 17/89* (2013.01)

(58) Field of Classification Search
CPC ...... G01S 7/4815; G01S 7/4817; G01S 17/10; G01S 17/89
See application file for complete search history.

(56) References Cited

U.S. PATENT DOCUMENTS

| 7,508,496 B2 | 3/2009 | Mettenleiter et al. |
| 2014/0365259 A1* | 12/2014 | Delplace ........ G06Q 10/063114 705/7.15 |
| 2018/0249143 A1 | 8/2018 | Calpe et al. |
| 2018/0267146 A1 | 9/2018 | Ingram et al. |

FOREIGN PATENT DOCUMENTS

| CN | 110140064 A * | 8/2019 | ............. G01S 17/34 |
| DE | 102005027208 A1 | 6/2006 | |
| JP | H09-197045 A | 7/1997 | |

OTHER PUBLICATIONS

Extended European Search Report dated Sep. 3, 2020 as received in Application No. 19216635.3.

* cited by examiner

*Primary Examiner* — Mark Hellner
(74) *Attorney, Agent, or Firm* — Maschoff Brennan

(57) ABSTRACT

A method for controlling an opto-electronic measuring device for radiation based object point measuring such as a laser tracker, laser scanner, multi beam scanner, laser profiler, scanning total station, flash lidar, airborne scanning lidar or scanning multi station. The power of the emitted measurement radiation is object individually automatically varied specific for a direction and distance to respective objects whereby the power is adjusted in such a way that it does not exceed a predefined distance dependent power limit applying to the respective object distance precisely when the measurement radiation is emitted in the respective object direction.

15 Claims, 4 Drawing Sheets

OBJECT SPECIFIC MEASURING WITH AN OPTO-ELECTRONIC MEASURING DEVICE

CROSS-REFERENCE TO RELATED APPLICATIONS

This application claims priority to European Patent Application No. 19216635.3, filed on Dec. 16, 2019. The foregoing patent application are incorporated herein by reference.

FIELD OF THE INVENTION

The present invention relates to a method for object specific variation of measurement radiation emission of an opto-electronic measuring device and an opto-electronic measuring system.

BACKGROUND

Optoelectronic measuring or surveying devices, using which a coordinate is determined based on measuring of distance and/or position with optical radiation, are known in manifold forms. Examples are geodetic surveying devices such as electronic tachymeters, total stations, multi-stations, or (single beam or multi beam) laser scanners for geodetic or industrial surveying purposes or laser trackers. These devices share the feature that they comprise at least one radiation source for generating measurement radiation and optical means such as lenses, light conducting fibers, or collimators, by means of which the generated measurement radiation can be emitted into free space in a targeting direction toward an object to be surveyed, because of which these devices are also referred to as so-called free beam sensors. A targeting direction and accordingly an emission direction and respectively a reception direction of the measurement beam are ascertained, for example by means of sensors for angle measurement which are assigned to a deflection mirror or a targeting unit of the system.

The target to be surveyed is, for example, a surface of a natural object or a target designed especially for surveying purposes, for example, a retroreflector. The irradiated object reflects measurement radiation in a diffuse or oriented manner (particularly retro-reflection), so that at least a part of the measurement radiation is reflected onto the measuring device. The measuring instrument has an optoelectronic sensor, which is designed for the time-resolved and/or location-resolved detection of the measurement radiation, for example, a PIN diode, a CMOS chip, a solid state photomultiplier (e.g. SPADs) or a position-sensitive detector (PSD). The desired measurement variable, for example, a distance value or a 2D/3D coordinate, is determined on the basis of the detected measurement radiation. Various measurement principles are available in this case, for example, ranging principles are phase difference measurement, frequency modulated continuous wave (FMCW), runtime measurement (time-of-flight, TOF), or measurement based on the Fizeau principle.

Carrying out a runtime measurement not only on the basis of a single respective detected light pulse or sampled point, but rather using multiple successive or adjacent light pulses and employing them for the measurement is known from the prior art for increasing the detected power and/or improving the signal-to-noise ratio. I.e., multiple light pulses and the object points thus sampled are combined to form one scanning point. Optical measurement radiation is understood in this case as electromagnetic radiation not only in the visible range of the spectrum, but rather also infrared light, i.e., radiation having a wavelength greater than approximately 700 nm. Optoelectronic surveying devices are known which use measurement radiation having a wavelength of 405 nm, 520 nm, 532 nm, 635 nm, 650-690 nm, 780 nm and/or 785 nm, 795 nm, 808-850 nm, 905 nm, 1064 nm, or 1545 nm and/or 1550 nm or 1500-1560 nm.

3D laser scanning in particular is a very effective technology for producing millions of spatial measurement points of objects within minutes or seconds. Typical measuring tasks are the recording of objects such as gear wheels, wings, ships, or aircraft, and/or the surfaces thereof or objects such as industrial plants, house façades, or historical buildings, but also accident locations and crime scenes. For this purpose, they have to be capable of sweeping the measuring radiation of an electronic distance measuring device (EDM) over a surface and simultaneously acquiring direction and distance in relation to the measurement point. Thus, such a device has a beam deflection or sweeping unit, by means of which the measuring radiation can be pivoted around at least one axis, usually two axes aligned perpendicularly to one another, for example, a vertical and horizontal axis. The beam deflector can be implemented in the form of a moving mirror or alternatively also by other elements suitable for the controlled angle deflection of optical radiation, for example, rotatable prisms, movable light guides, deformable optical components, etc. Finally, a so-called 3D point cloud is generated from the distance and the direction information correlated therewith for each point by means of data processing.

The quality of the measurement result and/or the quality of the determination of the desired measurement variable is substantially dependent on the signal-to-noise ratio (SNR). Elevated or high noise occurs above all during measurements outside, primarily due to solar radiation, which is incident directly or as ambient light diffusely on the receiving optical unit and then—for example, even in spite of an optical bandpass filter—on the detector of the measuring device. In particular when targeting and measuring bright surfaces, such as white house façades, the background radiation can be substantial, the shot noise level in the receiving unit rises and reduces the signal-to-noise ratio and thus the measurement accuracy.

The SNR is hence decisively dependent on the detected radiant power. A high detected radiant power is advantageous to be able to delimit the measurement radiation unambiguously and sharply from the noise and/or from the background radiation. In this case, the detected radiant power (with otherwise uniform conditions) is higher the higher the emitted radiant power. Only a small fraction of the emitted radiant power is received again, i.e., a majority of the emitted measurement radiation is "lost" unused. The maximum achievable measurement range is dependent to a high degree on the emitted power of the measurement radiation and/or energy of the radiation source.

High radiant powers are thus advantageous especially for the measurement in relation to a very remote target, even if in case of retroreflective targets such as reflective films, planar reflectors (cateyes), or retroreflectors—i.e., targets which are designed especially for surveying purposes and reflect radiation in an oriented and/or bundled manner—because the reflection surface thereof (for example, approximately 0.001 m$^2$) is small. A high radiant power is also important for surveying targets having low reflectivity and/or small reflection coefficients, as many natural surfaces have (natural targets are also to be understood in this case as man-made structures such as concrete, asphalt, or metal).

However, a laser beam must meet stringent safety regulations. Thus, according to state of the art the emission of measuring radiation by the measuring device is fixedly limited in order to ensure the laser beam meets a particular laser safety classification. Such previous scanning systems meet safety regulations by limiting the emission power (e.g. power of individual pulses), ensuring a minimum pulse width, or limiting the number of laser pulses per second according to a preset value, regardless of the range or other operating parameters of the object point measuring. In this way, the emittance is ensured to be safe at all times and does not expose people to radiation above the limit.

However, as said, these limitations disadvantageously reduce the measurement performance, e.g. scanning speed, measurement accuracy or measurement precision. It also can increase the difficulty in locating the laser spot using a camera of a measuring device.

DE102005027208 (A1) discloses a method for driving a laser scanner, wherein a minimum distance to be observed is determined in dependence on the laser power of the laser light source. The method comprises comparing an object distance detected during a measurement with the minimum distance and interrupting the scan if the detected object distance is less than the minimum distance. The scan is then restarted with a reduced power. If the detected distance then is again less than the new minimum distance for the reduced laser power, the laser power is reduced further until the calculated minimum distance is observed or the minimum laser power is reached-in which case the laser light source is deactivated automatically and the scanning is terminated. Thus, any object anywhere within certain distance limits triggers an overall reduced laser power and hence disadvantageously impairs the performance of the scan as a whole.

BRIEF DESCRIPTION OF THE INVENTION

It is therefore an object of some aspects of the invention to provide an improved method for radiation based measurement with an opto-electronic measuring device.

It is a further object of some aspects of the invention to provide such a method with improved automatic setting of the measurement radiation.

These objects are achieved by the realization of the characterizing features of the independent claims. Features that develop the invention in an alternative or advantageous manner can be gathered from the dependent patent claims and also the description including the descriptions of figures. All embodiments of the invention that are illustrated or disclosed in some other way in this document can be combined with one another, unless expressly stated otherwise.

Some aspects of the invention relate to a method for automatically controlling an opto-electronic measuring device, preferably a laser tracker, laser scanner, multi beam scanner (multi laser measuring beams simultaneously in different directions) laser profiler, flash lidar, airborne scanning lidar, scanning total station or scanning multi station. The method comprises an object point measuring, e.g. one or more points of surfaces of a building, workpiece or landscape (classic geodesy), with emitting of measurement radiation in a targeting direction into free space towards objects by the measuring device and receiving at least part of the measurement radiation reflected by an object point and time resolved and/or location resolved detection of said reflected measurement radiation by the measuring device. As in principle known in the art, based on the detected measurement radiation direction and an accurate distance ("accurate distance" merely meant in contrast to the "rough distance" described below) to one or more object points are measured—the distance for instance by time resolved radiation detection according to the time-of-flight principle—and therefrom a 3D-coordinate of the object point is determined. In case of a plurality of 3D-coordinates, gathered measuring multiple object points with scanning sweep of the measurement radiation (change of emittance direction e.g. by continuous rotation of the measuring head about two axes) a 3D-point cloud can be established, representing a surface of one or more objects.

The method comprises further an automatic object specific variation of the power of the emitted measurement radiation. Therein, respective rough distances and directions from the measuring device to objects within a field of view intended to be measured are determined, said rough distances are checked against stored predefined distance dependent power limits in order to adjust the power of the measurement radiation according to a respective power limit applying to the respective rough object distance such that a respective distance dependent power limit is not exceeded precisely when the measurement radiation is emitted in the respective object direction, thus measuring the accurate object point distance with measurement radiation individually adapted to a respective object distance.

Said otherwise, in the scope of said power variation, respective distances and directions from the measuring device to objects within a field of view intended to be measured are determined are roughly determined, for example in form of a rough 3D-position of a respective object relative to the measuring device. This rough measurement data is used for a direction specific variation of the emission of the measurement radiation whereby the emission power is adjusted specifically to a respective object distance, the measurement radiation being emitted with different power for different object distances and different object directions. Thereby, the power of the emitted radiation for said accurate distance measurement is adjusted in such a way that it is below a defined distance dependent power limit applying to the respective object distance precisely when the measurement radiation is emitted in the respective object direction. As said, an upper power limit value is defined according to object distance whereby power limits can be defined as a temporal average value, in addition (to said distance dependence) be defined in dependence of a sweeping rate of the measurement radiation (e.g. scanning rotation) and/or stored in form of a table. The distance dependent power limit is in conformity with the specified laser class of the measurement instrument. Thereby, "power" is not narrowed to the physical definition as such but in the context of the present invention means also an amount of energy transferred by the measurement radiation within a certain time period, e.g. the energy sum which can be received at an object point hit by the radiation within 100 ms. That is in this sense, "power limit" is to be understood as "energy limit", too.

The rough distance determination and emission variation are preferably continuously executed in parallel to the object point measuring. As another preferred option, the rough determination is effected directly in advance of the emittance of measuring radiation in such a way that the emission power of the probe flash is adjusted in real time for a respective object. The frequency of the execution of these automatic steps can thereby depend on an object's distance and/or on a parameter of the coordinate measuring, preferably a pulse rate of the measurement radiation and/or sweeping rate in case of a scanning measurement. Optionally, the steps are repeated at least once a second.

At the beginning of the operation or measurement, the emission power is optionally set according to a defined minimal power limit, i.e. in such a way the radiation is emitted with a power below the smallest eyesafe power. Such a low emission power is maintained until first rough object distance is available and considered, i.e. object point measuring can already start with low radiation power before rough distance and direction measurement resp. before such rough measurement values are evaluated for emission power adjustment. A power below the smallest "allowed" power is optionally set if at a later time the rough determination of distance and/or direction is disturbed or flawed. Said otherwise, the emission power (of the "fine" distance measurement) is adjusted to the smallest "allowed" power if the rough object distance is not (yet or any more) available or indefinite.

As an option, the rough distance is measured by rough measurement radiation emitted in or collinear to the targeting direction, e.g. laser light (which can have the same source as the measurement radiation for the object point measuring) or radar waves.

As another option, the rough distance is evaluated with respect to a measurement quality such as underlying signal strength or precision of the rough distance value and the variation of the emission power is depended on an evaluated quality of the respective rough object distance. Optionally, the emission power is set closest to the distance dependent power limit depending on the signal to noise ratio as a quality parameter deduced from the rough measurement. Even if the rough distance is a rough value, it can be under some circumstances be of sufficient quality, e.g. with a precision fulfilling a predefined gage and can substitute the fine distance measurement for the object (point) or be taken into account in determining a final accurate or fine object distance, e.g. as an additional measurement value.

Optionally, the object point measuring is a scanning measuring with continuous sweep of the targeting direction during radiation emission and the emission variation is in addition based on the sweeping rate. As another option in case of sweeping measuring, the rough determination is effected or lying ahead of the object point measuring.

In further developments of the invention, previous rough determination data is used for prediction of a future rough object distance and/or direction of an object moving relatively to the measuring device and taken into account in the emission variation, preferably for a future adjustment of the emission power.

In another development, the method comprises image based object classification and/or person recognition, in particular using machine learning and/or based on detection of an object movement. The emission is then varied in dependence of respective object classes and/or the result of the person recognition (for instance person detected, no person detected, e.g. each according to defined detection probabilities).

In another embodiment, the instrument comprises in addition to ATR and EDM a flash-lidar sensor which generates 3D-images of the closer environment where the limits of the safety regulation are effective. Object classification and/or person recognition based on 3D-point clouds using artificial intelligence or machine learning methods are even robuster than when using 2D images. Flash-lidars are equipped with an active illumination source and work also at low ambient light conditions.

Object classification and/or person recognition is as an additional option used to discard object point measuring (data) of objects of a defined class and/or of a person. For example, in direction of objects of an "irrelevant" class or of a person, no coordinative object point measurement is undertaken or coordinates measured from such objects are deleted or not considered when computing a 3D-point cloud.

As another option, the surrounding of the measuring device is separated in various object sectors and the emission power is adjusted specific to a respective object sector. Preferably, the sector sizes are continuously updated based on an actual or the latest rough distance and/or direction data.

Some aspects of the invention also relate to a measuring system for measuring of object points. The system comprises an opto-electronic measuring device, e.g. laser tracker, laser scanner, multi beam scanner, laser profiler, scanning total station, or scanning multi station, with a radiation source, in particular a laser source or superluminescence-LED, an emitting optics for emission of measurement radiation in a targeting direction into free space towards objects, and a detector for time-resolved and/or location-resolved detection of received measurement radiation reflected by an object point lying in the targeting direction.

The system comprises a measurement radiation emission controller designed for a rough determination of respective distances and directions from the measuring device to the objects and designed for direction specific variation of the emission of the measurement radiation. The emission power (e.g. by variation of pulse rate and/or pulse energy) is adjusted specifically to a respective object distance and the measurement radiation is emitted with different power for different object distances and different object directions in such a way that the power is below a defined distance dependent power (energy) limit applying to the respective object distance precisely when the measurement radiation is emitted in the respective object direction.

For the rough determination, the controller preferably comprises at least one of a light field camera or stereo camera, an (additional) active distance sensing or ranging unit, preferably based on RADAR, LIDAR, microwave or ultra sound, a contact actuation unit, e.g. a light curtain or mechanical contact unit. In addition, the system can comprise a photo camera or polarized light sensitive camera, wherein optionally the emitting optics of the measuring device is part of the optical path of the camera, and/or a thermographic camera. As another option, the controller is spatially separated from the measuring device (which means also a modular design of the measuring system in such a way that the controller can work either attached to or detached from the measuring device) and designed for remote setting of the measurement radiation.

Optionally, the system comprises a person wearable badge such as a wireless transmitter, detectable or identifiable by the controller. Thus, a person in the measurement environment can be detected or identified by the system which supports the rough determination of distance and direction to the person or even is the means for doing so (e.g. estimation of the distance based on received signal strength of the transmitter).

Aspects of the invention provide the advantage that the variation of the emission as described allows for an automatic targeted and intelligent adjustment of the radiation power specific to the different objects in the measurement surrounding of the measuring device. Power or energy limits can be observed exactly where necessary and to an extent as indeed required. Thus, there is no overdue restriction of the measurement radiation and thus of the measurement performance. In embodiments with a classification of objects or person recognition, the emission power can be adjusted even more object specifically.

BRIEF DESCRIPTION OF THE DRAWINGS

The method and system according to the invention is described or explained in more detail below, purely by way of example, with reference to working examples shown schematically in the drawing. Identical elements are labelled with the same reference numerals in the figures. The described embodiments are generally not shown true to scale and they are also not to be interpreted as limiting the invention.

Specifically.

DETAILED DESCRIPTION

Figure 1A:
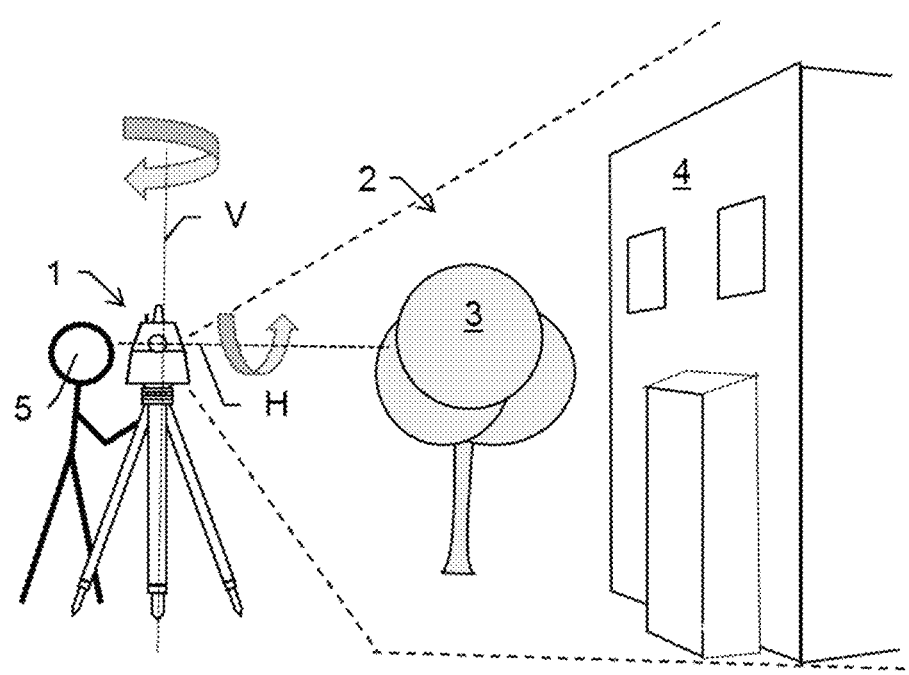
FIGS. 1a,b illustrate an opto-electronic measuring device and an object point measuring therewith according to the state of the art.
Figure 1B:
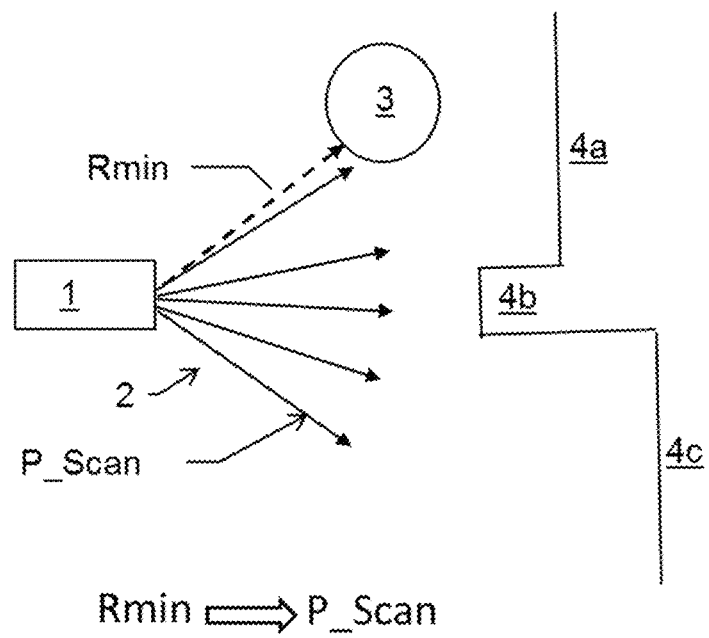

FIGS. 1a and 1b illustrate an opto-electronic measuring device 1 and an object point measuring therewith according to the state of the art.

A typical measuring or surveying device 1 is a laser scanner stationed at a measuring position by an operator 5 as shown in FIG. 1a. The laser scanner comprises a ranging unit (EDM) consisting of a beam source such as a laser source or superluminescence-LED and an emitting optics for targeted emission of the measuring radiation 2 into free space. Measuring radiation reflected by a point of an object 3, 4 lying in targeting direction is guided by a receiving optics (which often is the same or shares parts with the emitting optics) to a detector or photo sensor of surveying instrument 1. By time resolved and/or location resolved detection, direction and in addition the distance to the object point can be determined, e.g. based on time-of-flight and/or phase measurement. Such a generic surveying device 1 can comprise in addition to the basic measuring function a so called automatic target recognition (ATR) functionality for fine targeting and/or tracking of an object 3, 4 as in principle known in the art. Therefore, the instrument 1 can comprise an additional radiation source for emitting another or second measuring radiation which is detected by an additional photo detector.

In case of a scanner as surveying device 1, the targeting direction is continuously swept, for example changed by rotation around two axes using a rotating mirror for deflection of the laser beam around horizontal axis H and rotation of upper module of scanner 1 relative to the basis (tripod) around vertical axis V. The targeting direction and this direction to the respective object point is thereby measuring using angle encoders for the respective axis V, H. This sweeping allows for measuring the 3D coordinates of millions of object points around scanner 1 within a short time within a measuring field covered by measuring radiation 2. In case of a so called full dome scan substantially the complete surrounding up to a maximal measuring range is covered. From the measuring data, e.g. a 3D point cloud can be generated, representing the object's surfaces.

The measuring range and data quality (preciseness) of the surveying depends heavily on the signal strength or signal-to-noise ratio (SNR). Thus, spoken generally, a high at least transient emission power is preferable. However, for free space measurements in non-controlled measuring environments with "concentrated" radiation such as laser beams, power limits have to be observed, in particular eye safety limits, which runs contrary to the desired beam power in view of optimal signal strength.

It is known in the art, as schematically depicted in bird's eye view FIG. 1b, to limit the emission power automatically using the scan distances to objects 3 (tree) and 4a-4c (different walls or part of house 4 shown in FIG. 1a) in the measuring environment using the measuring radiation 2. If the distance Rmin to an object 3 determined with the measuring radiation 2 in course of the scanning is below a defined (emission power dependent) distance threshold, the emission power is reduced. This is repeated until the emission power complies to the limits of the measured distance, which can mean a complete termination of the scan if nearest object 3 is too close to the surveying instrument 1 such that even the minimal possible emission power is over the predefined limits for this distance. This means that in effect the nearest object 3 is the decisive for the laser safety regulation of the emission power of the scan. Said otherwise, the emission power P_Scan applicable for the scan is derived from the lowest detected object range Rmin as emblematically depicted at the bottom of FIG. 1b.

In the example, the nearest object in the field is tree 3. Although such a tree 3 (normally) is not an object of the surveying task as such but only the building 4 resp. objects 4a-4c are relevant for measuring, the emission power P_Scan for the complete measuring procedure and hence for all object points is set in dependence of tree 3. This is indicated in FIG. 1b in that the thickness of all arrows 2 representing the measuring beam in a respective targeting direction is the same. Hence, a disturbing object 3 diminishes the emission power in general, thus reduces the SNR of all signals and the overall measurement quality.

This is particularly disadvantageous as the disturbing tree 3 is even not susceptible to high radiation power. But instruments of the state of the art are not capable of discerning objects and check if a respective object implies for instance the necessity to observe eye safety criterions or not.

Figure 2A:
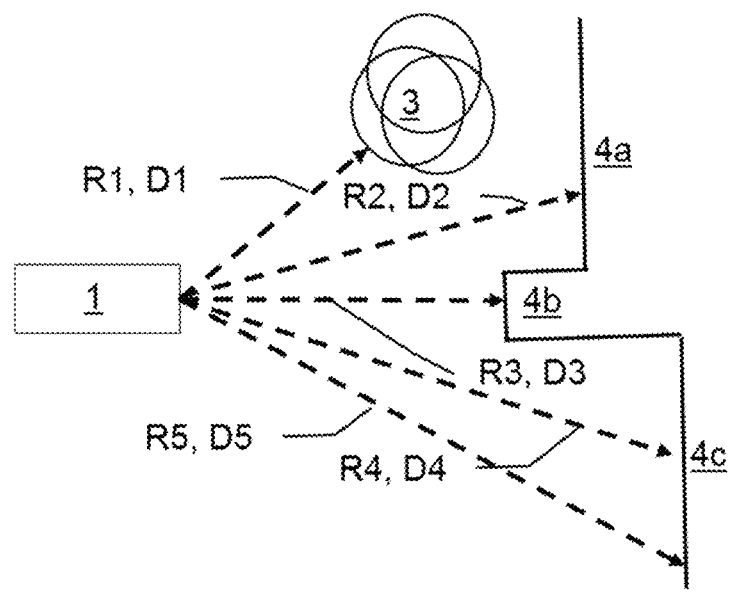
FIGS. 2a,b show a first example of emission power adjustment of an opto-electronic measuring device according to the invention.
Figure 2B:
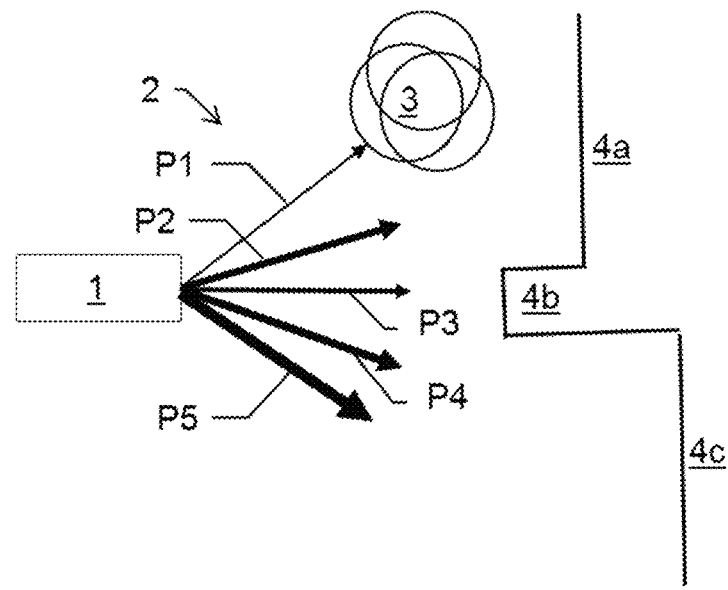

FIGS. 2a and 2b illustrate in a bird's eye view a method of automatic emission handling of an opto-electronic measuring device 1, e.g. a laser scanner, according to the invention. The method comprises an object (position) specific regulation of the emission of measuring radiation 2, e.g. measuring radiation for fine object point measuring and/or for target finding or tracking as described above with respect to FIG. 1a.

As shown in FIG. 2a, distance R1 and direction D1 from measuring device 1 specifically to object 3 is determined as well as the other respective distances R2-R5 and respective directions D2-D5 to the other objects 4a-4c. These distances R1-R5 are for example determined based on a rough scanning procedure, e.g. with thin coverage of the scanning environment, resulting in an approximate position of the respective object 3, 4a-4c or points of the objects 3, 4a-4c relative to the laser scanner 1. In other words, the different distances D1-D5 to object points lying in different targeting directions D1-D5 are coarsely measured. This rough determination can comprise an explicit determination of a rough 3D-position of a respective object 3, 4a-4c.

Based on these individual rough distances R1-R5 and directions D1-D5, the emission of the measuring radiation 2 for the ("genuine" or fine) scanning is specifically adjusted, considering predefined distance dependent power limits, e.g. stored in a look-up table of the measuring instrument. This means that the measuring radiation 2 for the accurate distance measuring of the object points is emitted in direction to the near object 3 with a first power P1, which is set relatively low as the power limit is the smaller the smaller the distance. In direction to object 4a, being in a further distance, the radiation 2 is emitted with a higher power P2, indicated in the figure by a greater thickness of the arrow P2 compared to arrow P1.

Then again, the power P3 emitted in direction of object 4b is lowered compared to power P3 in direction of object 4a as the rough distance to object 4b is smaller than the one to object 4a. As then the object distances are increasing again following the course of object surface 4c, the emitting power P4, P5 in the respective direction to object 4c is more and more increased.

Thus, according to the invention there is a direction specific variation of the emission power P1-P5 as a distinct and individual adaption to a respective object distance R1-R5. As an option, the determination of rough distance is done directly in advance of the emittance of measurement radiation. This allows for a real time specific adjustment of the emission power.

As another option, the directions are "pooled" in distinct object sectors such that for instance for a certain angular range of the targeting direction the same emission power is applied, e.g. based on an average rough distance of this direction section. This can e.g. be used to provide a buffer zone around an object, e.g. object 4b, in which the power according to distance R3 is applied some space beyond the actual object size.

This is particularly advantageous in case of a movable object which might slightly change its position between rough determination and scanning by measuring beam 2. Such sectors can be continuously updated based on an actual rough distance or direction. In addition, in case of a moving object, a determined movement can be taken into account for defining the size or position of a sector. Above that, from previous measurement data, a future distance and direction to a moving object is predicted and taken into account in the controlling. If for instance a moving object such as a person is heading towards device 1, it can be assumed that he or she will be within a certain distance range at a certain location within a certain time. In direction of this predicted location, the emission power is then precautionarily reduced according to said distance range, either immediately after prediction or after a certain time according to the calculation. The other way round, it can be predicted that a certain area will be person free in some time and thus be available for coordinate measuring with less restrictive power limits, which are according to the invention are observed as described in the following.

The respective emission power P1-P5 is according to the invention set in such a way that the predefined distance dependent power limits are not exceeded. That is that a power limit suitable for range R1 (distance to object 3) is specifically complied to when emitting radiation 2 in direction to object 3, a power limit suitable for range R2 (distance to object 4a) is specifically complied to when emitting radiation 2 in direction to object 4a, a power limit suitable for range R3 (distance to object 4b) is specifically complied to when emitting radiation 2 in direction to object 4b and so on. Such a coordinate measuring starts optionally with a low emission power such that the power limit for the smallest possible object distance is not exceeded wherefore coordinate measuring can begin even before rough distances are available.

The power limits can thereby depend fully continuously on distance. Alternatively, the limits change stepwise with distance such that for object points within a certain range interval the same power limit applies and accordingly the same emission power is used, let's say in the example emission powers P1 and P3 could be the same as distances R1 and R3 are nearly equal and within the same distance interval which means one and the same power limit value.

The sweeping rate or angular velocity of the targeting can be additionally taken into account in the definition or setting of the power limits. For instance, the faster the sweeping the higher is the power limit for a certain distance, with a lowest power limit in case of a very low sweeping rate or static or single point measurement. A power limit may optionally be defined as a temporal average value. That means that the energy of the measurement radiation summed up over a time period of e.g. 10 us, 1 ms or 1 s has to comply to a defined power limit. If for example the measurement radiation is emitted in form of laser bursts, not a single burst is decisive for compliance to power limit, but the averaged power of a certain number of bursts.

The particular advantage of the invention is the result that only emission power limits that really have to be observed for the actual distance R1-R5 to a respective object restrict the emission power P1-P5. There is no over-extensive reduction of the emission and restriction of the scan but precisely an adjustment as necessary for a particular emission or targeting direction in the current measuring environment in view of a defined distance dependent power limit according to the determined (rough) distance. The emission is adapted on a case by case basis to the specific location of an object relative to the surveying device.

Figure 3:
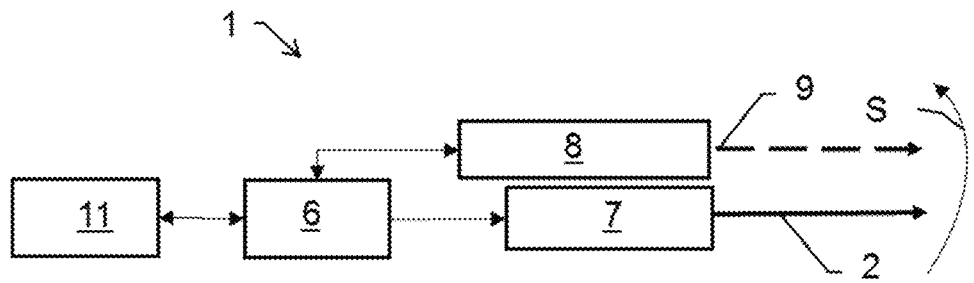
FIG. 3 shows an exemplary schematic embodiment of a measuring device according to the invention.

FIG. 3 depicts another embodiment of the present invention. The surveying device 1 comprises a laser 7 for emittance of laser light as measurement radiation in the targeting direction. The laser 7 is controlled by an electronic unit 6 such as a FPGA (Field Programmable Gate Array). A computing unit 11 such as a PC, Laptop, tablet or smartphone is connected to the FPGA 6 and serves as user interface and for data treatment/management and storage.

The controller 6 is in addition connected to a rough distance determination unit 8 arranged nearby laser 7, e.g. a second LIDAR system, or ultra sound, microwave or RADAR based range finder. The range finder 8 emits and receives rough measurement radiation 9 in or collinear to the targeting direction and determined a rough distance based thereon.

The rough distance values are transferred to the FPGA 6 which checks them against stored power limit values and uses them to adjust the emission power of laser 7 accordingly.

As an option, the rough values are taken as the final measurement value for an object point (in particular accurate object point distance) and stored on a storage of instrument 1 (or an external storage device). That is, if for example controller 6 determines that the quality of the rough distance is sufficient—either in that it is within preset quality standards or controller 6 recognizes that due to the power limits derivated from the rough distance a further measurement would not result in a more precise distance value—the subsequent "fine" measurement is assessed as obsolete. Thus, the power of the measurement radiation emitted in direction to the respective object (point) is set to zero and therewith below (every) power limit. Hence, exceeding a power limit is prevented "at the very root" due to such a quality evaluation of the rough distance and thus (additional) smart usage of it, with the additional advantage that power consumption is reduced less measurement energy is needed altogether. A zero-emission for "fine" distance measurement can also be set in case the rough distance is measured with a laser light already fully "consuming" the allowed eyesafe power within a certain time period. Then, the system temporarily interrupts the measurement for a certain time period, e.g. a few microseconds. Preferably, the rangefinder 8 measures continuously rough distances and the power adjustment is executed continuously. The adjustment is optimally done when the emission power is set closest to the power limit according to the laser safety regulation, thus the allowed power is fully taken advantage of, resulting in best possible signal to noise ratio.

If for instance at the very start of object measuring or due to a disturbance of range finder 8 or electronic unit 6 no usable rough distance values are available, the surveying device 1 optionally regulates the emission power of laser 7 according to a certainly uncritical value limit. This guarantees that in any case, even in the special case that the rough determination of distance and/or direction is unreliable or has failed and no (reliable) object distance or direction is available which an adjustment of emission power could be based on, no emission of measurement radiation above certain power limits is effected. This emission power adjustment for indefinite rough values can also be applied object or direction specific. That is if for example not all available rough distance values are considered unreliable or are missing but only one or more rough distance values for a specific object or within a certain distance range or within a certain sector, the emission power is set below the "reserve" defined power limit only for this specific object or sector; the emission power for the other sectors or emission directions wherefore solid rough values exists is adjusted according to these rough values.

In the arrangement as shown the surveillance unit 8 is displaced with respect to the laser 7 in such a way that is measures object points lying ahead of the target pointing of laser 7 in scanning. The parallax of unit 8 to unit 7 allows with the depicted sweeping or scanning direction S rough distance determination for object points directly in advance of the subsequent laser beam measurement. Thus, the emission power can be set specifically to the rough distance from the very beginning of the scanning Having an accordingly fast update frequency, e.g. 1 Hz at least, typically 1 kHz, of the power controlling, the emission power is varied "just in time", in particular without any prolongation of the surveying/scanning task.

The (update) rate of the emission power controlling can thereby depend on the rough distance or a parameter of the coordinate measuring, in particular a laser pulse rate or sweeping rate of the scanning. If for example the scan dynamic is raised, the controlling rate is raised accordingly.

Figure 4A:
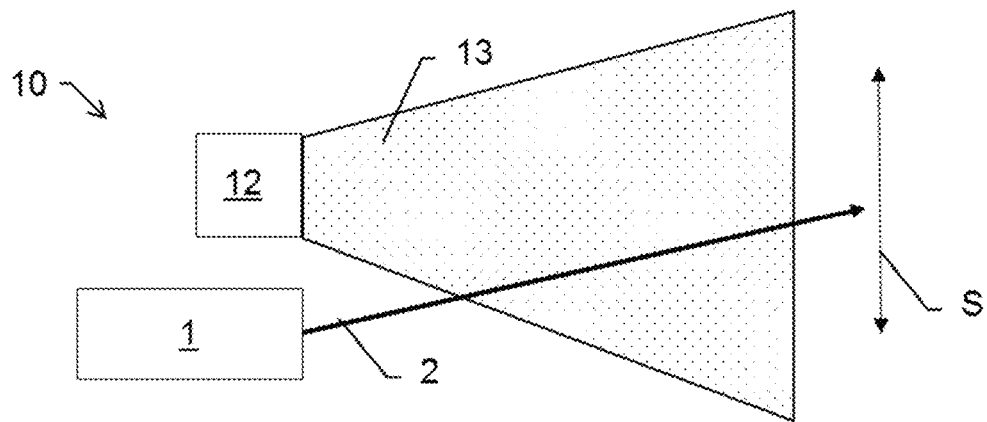
FIGS. 4a,b show further settings for emission power control.

FIGS. 4a,b show further settings for emission power control.

FIG. 4a illustrates a measuring system 10 with a measuring device 1 for said coordinate measuring with e.g. a laser beam 2 emitted in a targeting direction, whereby in the example the beam 2 is swept within a certain angular range, indicated by arrow S.

System 10 further comprises a measurement radiation control unit 12 with a rough rangefinder and a controller as in principle described e.g. in FIG. 3. In contrast to the embodiment according to FIG. 3, the control unit 12 is spatially or physically separated from the measuring device 1 with known or defined position relative to the measuring device 1 and determines direction assigned distances not necessarily collinear to the targeting direction of the measuring device 1, but surveys objects with respect to direction and rough distance within a certain area 13. The emission power of beam 2 is then remotely controlled by unit 12.

The rangefinder of the control unit 12 preferably has a relatively wide field of view, which covers for example the complete sweeping range S of measuring beam 2 simultaneously and preferably enables rough position determination of all objects within area 13 at once. The control unit 12 comprises for example one or more light field cameras, polarized light sensitive camera, flash-lidar, or stereo cameras as rangefinder, e.g. for rough distance determination based on triangulation, or a contact unit which is activated when an object enters area 13. Such a contact actuation unit is for example embodied as a light curtain or one or a plurality of mechanical contact sensors at a fixed, (pre-) determined distance which determines the location of contact and thus the direction to the contacting object from the measuring device 1. The control unit 12 can further comprise additional devices such a panorama camera or thermographic camera.

Figure 4B:
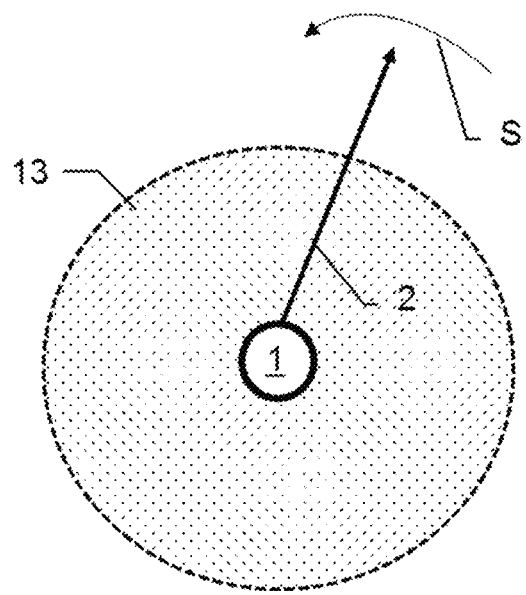

As shown in FIG. 4b, the field of view 13 can even extend completely around measuring device 1. This is particularly advantageous for a 360°-scan (sweep S completely around vertical axis of measuring device 1). A 360°-distance monitoring can for example be accomplished with a set of distributed rangefinders with contacting or overlapping field of views or a rangefinder with fast sweeping of field of view.

Figure 5A:
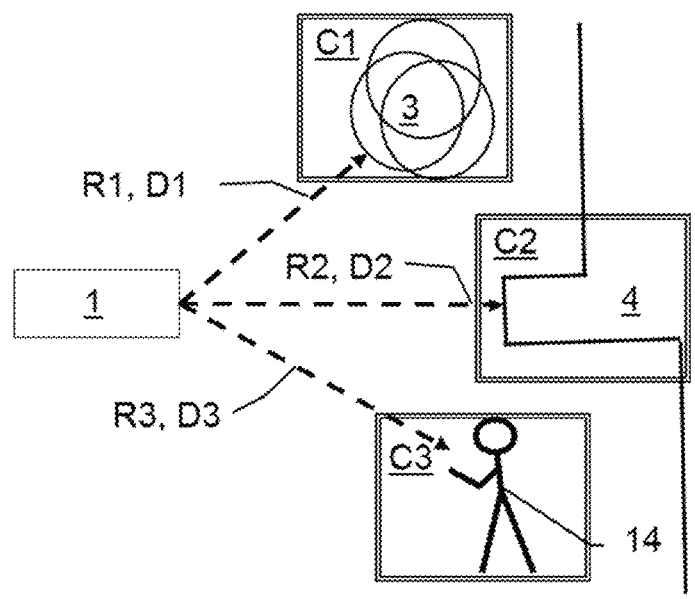
FIGS. 5a,b illustrate a further development of the invention, comprising object classification respectively person recognition.

FIGS. 5a,b, based on FIGS. 2a,b, illustrate a further development of the invention. This embodiment comprises in addition object classification respectively person recognition.

In FIG. 5a is shown that in addition to the determination of (rough) distances and directions R1,D1-R3,D3 to objects 3, 4, 14, objects 3, 4, 14 are classified by image processing techniques. 2D or 3D images of the objects 3,4,14 are used to classify them, e.g. using machine learning algorithms, which establish classes C1-C3 by training on according objects. Object 4 is classified as a building (class C2), object 3 as a tree or plant (class C1), object 14 as a person or creature (class C3). A recognition of a person is additionally or alternatively based on a detected movement of such an object 14 which is interpreted e.g. dependent on its extent or duration. Person recognition and as an option rough position determination of a person 14 is optionally further supported or facilitated in that the person 14 wears a badge such as a mark or wireless transmitter which is detectable or can be identified by the measuring device 1 respectively the control unit.

Figure 5B:
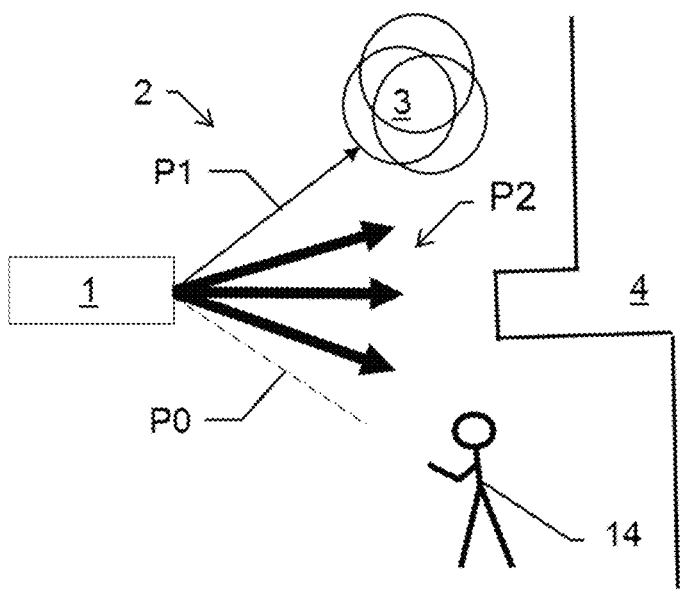

As depicted in FIG. 5b, the emission power adjustment is not only based on respective object distances and directions, but in addition based on a respective object class C1-C3. As object 4 is recognized as a building, the definition of the power limit in the direction of building 4 is according to the distance and the object class C2. Thus, based on the classification, the measurement radiation 2 directed at building 4 is set at a relatively strong power P2. This results in an even more improved fulfilment of the basic task of the exemplary measuring procedure, the coordinative measuring of this object class. In the example the power level P2 is the same for the whole building. Said otherwise, the dependence on distance is relaxed compared to the example of FIG. 2b concerning object 4 as all distances (at least within certain value ranges) to the different surface points of object 4 are treated equally.

The emission power P1 to the object 3 is comparably lower than the power P2 for building 4. Though the distance dependence of the defined power limit for class C1 is in the example the same as for class C2, such a tree 3 belongs to class C1 which is seen as not relevant for the coordinate measuring as such. The tree's coordinates are not of interest. A low quality coordinate measuring with low radiation power 1 is for example only used to determine an area of the scanning environment—respectively the point cloud representing it—which is occluded by such an irrelevant object 3 and has to be supplemented or completed by a scan from a second stationing of measuring device 1. Accordingly, a classification of objects 3, 4, 14 and thereby distinction of relevant objects 4 and irrelevant object 3, 14 with respect to coordinate measuring is optionally used to discard object point measuring data from the whole scan data set. Thus, a 3D point cloud can be "cleaned" from objects of no interest.

The emission power is further varied in such a way that the power P0 in targeting direction D3 to person 14, classified as such in the previous classification step, is set to zero in the example. Thus, person 14 is not at all troubled by a measurement beam. A power limit of zero according to class C3 "person" is in particular used if the rough distance is determined not with the coordinate measurement radiation itself but with an additional measurement unit such a depicted in FIGS. 3, 4a,4b. An additional advantage of a power of zero P0 and a strong reduction of measurement radiation P1 or more generally spoken of the target specific variation of emission power is a possible intelligent reduction of power consumption of measuring device 1. Accordingly, for example, the power limit defined for class C3 can be zero for all object distances, and therefore the emission in direction of an object classified as class C3 is nil for any distance of such an object.

Although the invention is illustrated above, partly with reference to some preferred embodiments, it must be understood that numerous modifications and combinations of different features of the embodiments can be made. All of these modifications lie within the scope of the appended claims. It goes without saying that these figures illustrated are merely schematics of possible exemplary embodiments.

What is claimed is:

1. A method for automatic control of an opto-electronic measuring device, the method comprising:
    emitting of measurement radiation in a targeting direction into free space towards an object point by the opto-electric measuring device;
    receiving at least part of the measurement radiation reflected by the object point;
    time resolved or location resolved detection of said reflected measurement radiation by the opto-electric measuring device; and
    measuring of an accurate object point distance based on said measurement radiation detection,
    wherein an automatic object specific variation of the power of the emitted measurement radiation is obtained for said accurate object point distance measuring, comprising:
    respective rough distances and directions from the measuring device to objects within a field of view intended to be measured are determined,
    said rough distances are checked against stored predefined distance dependent power limits in order to adjust the power of the measurement radiation according to a respective power limit applying to the respective rough object distance such that a respective distance dependent power limit is not exceeded precisely when the measurement radiation is emitted in the respective object direction,
    the accurate object point distance is measured with measurement radiation individually adapted to a respective object distance.

2. The method according to claim 1, wherein said automatic variation is continuously executed during said object point measuring.

3. The method according to claim 1, wherein the determination of respective rough distances and directions is effected directly in advance of the emittance of measuring radiation in such a way that the power is adjusted in real time for a respective object.

4. The method according to claim 2, wherein a frequency of the execution of said variation is:
    dependent on an object's distance, or
    dependent on a parameter of said object point measuring.

5. The method according to claim 1, wherein the rough distance is measured by rough measurement radiation emitted in or collinear to the targeting direction.

6. The method according to claim 1, wherein the object point measuring is a scanning measuring with continuous sweep of the targeting direction during radiation emission with a sweeping rate and the power limits are in addition predefined with respect to sweeping rate, in particular wherein the rough determination is lying ahead of the object point measuring.

7. The method according to claim 1, wherein based on a previous rough object distance or direction, a future rough object distance or direction of an object moving relatively to the measuring device is predicted and taken into account in the emission variation.

8. The method according to claim 1 further comprising:
    performing image based object classification or person recognition.

9. The method according to claim 8, further comprising:
    discarding of object point measuring of objects of a defined class or of a person.

10. The method according to claim 1, wherein the power is set closest to the respective applicable distance dependent power limit depending on the signal to noise ratio of a measurement underlying the rough determination of respective distances and directions as a quality parameter deduced from the rough determination.

11. The method according to claim 1, further comprising:
    separating the surrounding of the measuring device in various object sectors and adjusting the power specific to a respective object sector.

12. A measuring system for measuring of object points comprising an opto-electronic measuring device, the measuring device comprising:
    a radiation source;
    an emitting optics for emission of measurement radiation in a targeting direction into free space towards object points;
    a detector for time-resolved or location-resolved detection of received measurement radiation reflected by an object point lying in the targeting direction in order to measure an accurate object point distance;
    a measurement radiation emission controller designed for object specific variation of the power of the measurement radiation emitted for said accurate object point distance measuring, the measurement radiation emission controller being configured to:
- determine respective rough distances and directions from the measuring device to objects within a field of view intended to be measured,
- check of said rough distances against stored predefined distance dependent power limits in order to adjust the power of the measurement radiation according to a respective power limit applying to the respective rough object distance such that a respective distance dependent power limit is not exceeded precisely when the measurement radiation is emitted in the respective object direction,
- measure the accurate object point distance with measurement radiation individually adapted to a respective object distance.

13. The measuring system according to claim 12, wherein for the rough distance determination, the controller comprises at least one of the following means:
- a light field camera, polarized light sensitive camera or stereo camera,
- an active distance sensing unit,
- a contact actuation unit.

14. The measuring system according to claim 12, wherein the measuring system further comprises a badge capable of being worn by a person.

15. A computer program product, stored on a tangible, non-transitory machine-readable carrier, for controlling or executing the method according to claim 1.

* * * * *